E. C. RINNER.
CUTTER.
APPLICATION FILED SEPT. 11, 1909.
996,795.
Patented July 4, 1911.
2 SHEETS—SHEET 1.
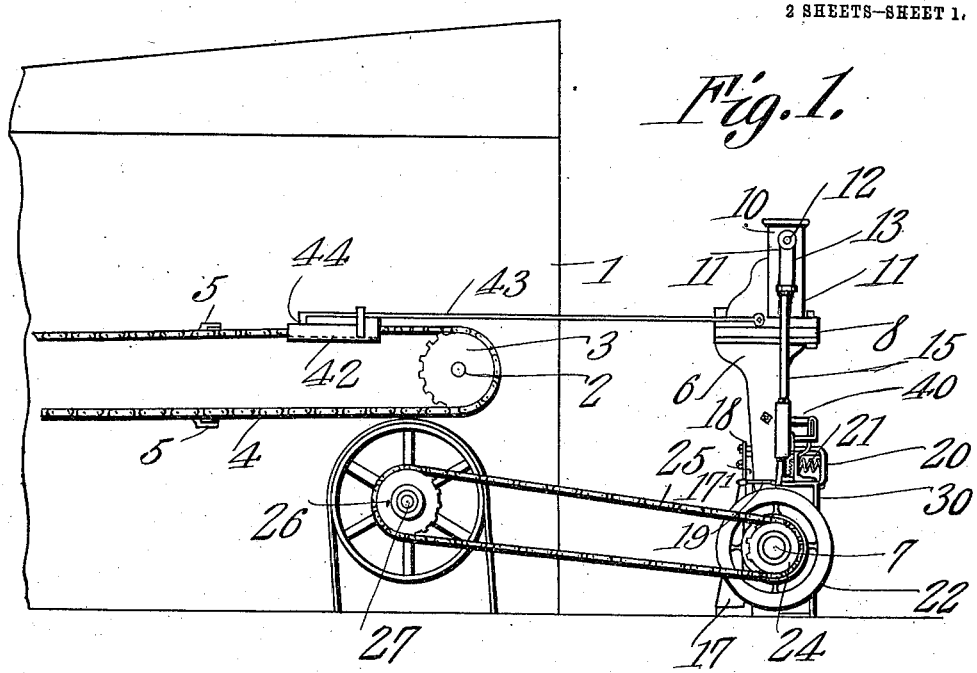
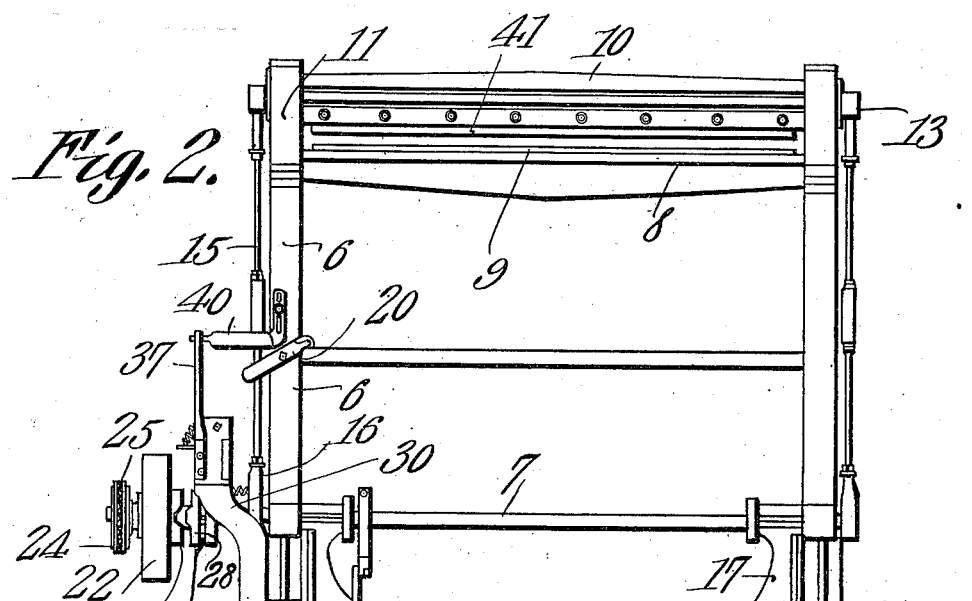
Witnesses
Inventor
Elijah C. Rinner.
By C. A. Snow & Co.
Attorneys E. C. RINNER.
CUTTER.
APPLICATION FILED SEPT. 11, 1909.
996,795.
Patented July 4, 1911.
2 SHEETS—SHEET 2.
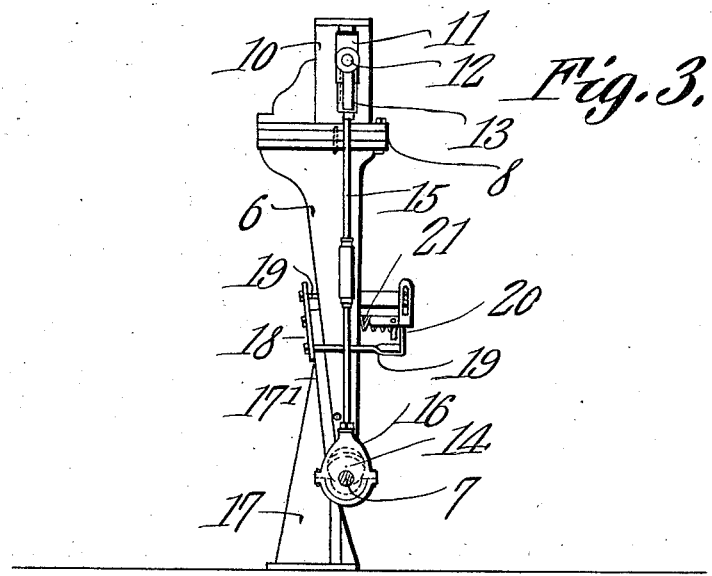
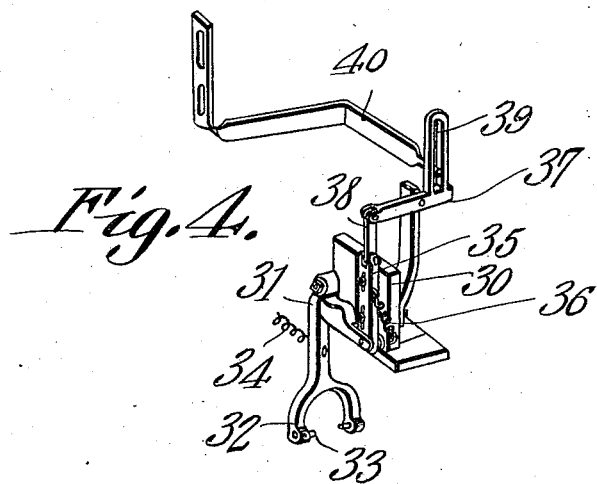
Witnesses
Inventor
Elijah C. Rinner.
By C. A. Snow & Co.
Attorneys

UNITED STATES PATENT OFFICE.

ELIJAH C. RINNER, OF COSHOCTON, OHIO.

CUTTER.

996,795.

Specification of Letters Patent.

Patented July 4, 1911.

Application filed September 11, 1909. Serial No. 517,211.

*To all whom it may concern:*

Be it known that I, ELIJAH C. RINNER, a citizen of the United States, residing at Coshocton, in the county of Coshocton and State of Ohio, have invented a new and useful Cutter, of which the following is a specification.

This invention has relation to cutters and it consists in the novel construction and arrangement of its parts as hereinafter shown and described.

The object of the invention is to provide a cutter especially adapted to be used in conjunction with a machine or apparatus for producing a continuous strip of material and the cutter is so arranged and operatively connected with the said machine or apparatus as to receive the material from the said machine or apparatus and automatically cut the same into sheets of predetermined size. The sheets of material as they are cut from the strips are permitted to pile one upon the other and during the cutting operation the cutting knives travel with the sheets at the same rate at which the sheet is passing from the producing machine or apparatus.

With the above object in view the cutter includes a frame pivotally mounted upon standards in the vicinity of the delivery end of a strip-producing machine or apparatus and means operatively connecting the frame with a moving part of the machine or apparatus whereby the said frame at intervals is caused to move upon its pivot away from the machine or apparatus at a rate of speed equal to that at which the strip of material is passing through the machine or apparatus, and at the same time means is provided upon the cutter to cause its knives to coöperate and cut a piece of the material from the strip. After the said sheet of material has been cut means is provided for causing the cutter to assume its normal position with respect to the delivery end of the machine or apparatus.

The cutter is especially designed to be used in connection with a machine for making sheet paper or straw board but it may also be used to advantage in combination with machines for producing sheets composed of material of other character.

In the accompanying drawings, Figure 1 is a side elevation of the delivery end portion of a machine for producing sheet material with the cutter located adjacent thereto; Fig. 2 is a detail side elevation of the cutter; Fig. 3 is an end elevation of the cutter; Fig. 4 is a perspective view of a clutch operating mechanism used upon the cutter.

As illustrated in the accompanying drawings, 1 represents a machine or apparatus such as is generally employed for producing a strip of paper, board or similar material and the shaft 2 of the said machine upon which is located the sprocket wheel 3 is the shaft or one of the shafts forming a component part of one of the delivery conveyers of the machine 1 upon which the material is deposited and by which it is conveyed from the machine. A sprocket chain 4 is arranged to operate around the wheel 3 and is provided at intervals along its length with stops 5. By this arrangement the sprocket chain 4 moves in an orbit around the sprocket wheel 3 and its upper and lower runs are arranged to move at the same rate of speed as the upper and lower runs of the conveyer upon which the strip of material is carried from the machine 1.

The frame of the cutter includes uprights 6 which are mounted at their lower ends upon a shaft 7 and are connected together at their upper portions by a table 8. A knife 9 is mounted upon the upper surface of the table 8 and a head 10 having at its ends vertically disposed guides 11 is also mounted upon the said table 8. The head 10 is provided at its ends with pins or projections 12 which extend through the guides 11 and arms 13 are journaled upon the projecting portions of the said pins 12. Eccentrics 14 are fixed to the shaft 7 beyond the outer sides of the uprights 6 and rods 15 connect the arms 13 with eccentric straps 16 which surround the eccentrics 14. The shaft 7 is journaled for rotation in bearings provided upon the standards 17 and one of the said standards is provided with an upwardly projecting extension 17' against which the edge of one of the uprights 6 normally lies. A crossbar 18 is located at the upper portion of the extension 17' and its ends are connected by means of rods 19 with a similar crossbar 20 which is transversely disposed with relation to the adjacent upright 6. A coiled spring 21 is interposed between the bar 20 and the upright 6 and is under compression with a tendency to hold the said upright 6 against the side of the extension 17' of the adjacent standard 17. A fly wheel 22 is loosely journaled upon an end portion of the shaft 7 and is provided with a clutch-hub 23. A sprocket wheel 24 is concentrically fixed with relation to the fly wheel 22 and a driving chain 25 passes around the sprocket wheel 24 and sprocket wheel 26 mounted upon one of the driven shafts 27 of the machine 1. A clutch member 28 is splined upon the shaft 7 adjacent the clutch-hub 23 of the fly wheel 22 and is provided with an annular recess 29. A stand 30 is fixed adjacent one of the standards 17 and is located in the vicinity of the clutch member 28; an angular lever 31 is fulcrumed to the stand 30 and is provided with a bifurcated end 32 the extremities of which have inwardly disposed pins 33 which enter the recess 29 of the clutch member 28. A spring 34 is attached at one end to the lower portion of the lever 31 and at its other end to the side of the adjacent standard 17 or other fixed points. The said spring 34 is a trenchant spring and has a tendency to hold the clutch member 28 away from the clutch-hub 23 of the fly wheel 22. A bar 35 is slidably mounted upon the stand 30 and is pivotally connected at its lower end with the upper end of the lever 31. A spring 36 is connected at one end with the bar 35 and at its other end with the stand 30 and is under tension to hold the said bar in a lowered position. A lever 37 is fulcrumed upon the stand 30 and one end thereof is operatively connected with the upper end of the bar 35 by means of a link 38. The other end of the lever 37 is provided with an elongated slot 39 in which is slidably mounted the end of an arm 40 which in turn is attached to the adjacent upright 6. A knife 41 is carried by the head 10. A guide 42 is fixed to the side of the machine 1 and receives a portion of the upper run of the chain 4. A rod 43 is pivotally connected at one end with the upper portion of one of the uprights 6 and at its other end enters the guide 42 and is provided with a downwardly disposed extremity 44 which is located in the path of movement of the stops 5.

The operation of the cutter is as follows: Presuming that a strip of material is being delivered from the machine 1 to the table 8 of the cutter, the said strip passes between the knives 9 and 41. At the same time the shaft 2 and wheel 3 are rotating and the chain 4 is moving in an orbit. At the same time the fly wheel 22 is rotated upon the shaft 7 through the instrumentality of the sprocket wheels 24 and 26 and sprocket chain 25. During the time that one of the stops 5 is approaching the downturned extremity 44 of the rod 43 the cutter and its attachment remain at a state of rest and the strip of material passes through the same. When the approaching stop 5 engages the extremity 44 of the rod 43 at the guide 42 the upper run of the chain 4 is so held by the said guide 42 that the said stop 5 is maintained in position against the downturned portion 44 of the said rod 43 and consequently the rod 43 moves longitudinally at the same rate of speed as that at which the upper run of the chain 4 is moving. As the upper run of the chain 4 moves at the same rate of speed as that at which the material is passed from the machine 1 through the cutter the table 8 moves at the same rate of speed as the material and in the same direction in which the material is moving. As the uprights 6 turn upon the axis of the shaft 7 in following the movement of the table 8 the arm 40 bears against the end of the lever 37 and swings the said lever so that the link 38 and the bar 35 are moved longitudinally against the tension of the spring 36. As the bar 35 moves as indicated the lever 31 is swung upon its fulcrum against the tension of the spring 34 and the bifurcated end of the said lever 43 moves the clutch member 28 into engagement with the clutch-hub 23 of the fly wheel 22. Inasmuch as the clutch member 28 is splined upon the shaft 7 the said shaft is caused to rotate in unison with the fly wheel 22 and as the said shaft 7 rotates the eccentrics 14 are carried around its axis and thus the rods 15 are moved longitudinally and the head 10 is lowered toward the table 8 which causes the knife 41 carried by the head 10 to coöperate with the knife 9 upon the table 8 and cut the strip of material into a sheet which is permitted to fall at that side of the cutter remote from the machine 1. During the lateral movement of the upright 6 as above described the spring 21 is further compressed and when the stop 5 arrives at the end of the guide 42 the upper run of the chain 4 being relieved of support may sag sufficiently to let the stops 5 pass under the downwardly disposed extremity 44 of the rod 43. When the stop 5 passes under the said extremity the tension of the spring 21 comes into play and the uprights 6 are forced back against the upward extremities of the standards 17 and as the arm 40 reverses its movement from that above described the parts connecting the said arm with the clutch 28 will act in reverse order to that above described which movement is produced by the arm 40 and the springs 36 and 34, then the clutch member 28 is disengaged from the clutch hub 23 of the fly wheel 22 and the shaft 7 comes to a state of rest.

Thus it will be seen that a simple and an effective cutting mechanism is provided to be used in combination with a delivery machine or apparatus for severing a continuous strip of material into a succession of sheets which as they are cut may be permitted to pile one upon the other. It will also be seen that the operation of the cutter is accomplished through means which connects the cutter with operating parts of the delivery machine and that the cutting of the sheets is accomplished at a time that the cutter is moving in the same direction as that in which the strip is moving and at the same rate of speed but after the sheet has been severed from the strip, the cutter is caused to assume its normal position while the strip continues its movement through the same. This results in a saving of time for it is not necessary to stop the operation of the delivery machine in order to reduce a strip coming therefrom to a series of sheets.

Having thus described my invention, what I claim as new and desire to protect by Letters Patent is:—

1. A cutter comprising a frame having a table, a shaft journaled in the frame, standards in which said shaft is journaled, means for holding the frame in a normal position with relation to the standards, a clutch mechanism mounted upon the shaft, mechanism for operating the clutch mounted upon a fixed support and connected with the clutch and the frame and a knife mounted upon the frame and operatively connected with the shaft.

2. A cutter comprising a frame having a relatively fixed table, a shaft journaled in the frame, standards having bearings which receive said shaft, means for swinging the frame with relation to the standards, a clutch device located upon the shaft, mechanism operatively connecting the clutch device with the frame and a knife carried by the frame and operatively connected with the shaft.

3. A cutter comprising a frame having a relatively fixed table, a shaft journaled in the frame, standards having bearings receiving said shafts, a spring means for holding the frame in position against the standards, means for moving the frame away from the standards at intervals, a clutch device located upon the shaft, mechanism operatively connecting the clutch device with the frame, a knife carried by the frame and means operatively connecting said knife with said shaft.

4. A cutter comprising a frame having a relatively fixed table, a shaft journaled in the frame, standards having bearings which receive said shaft, a spring means for holding the frame in a normal position with relation to the standards, means for moving the frame away from the standards at intervals and against said spring-retaining means, a clutch device located upon the shaft, mechanism operatively connecting the clutch device with the frame, and a knife carried by the frame and operatively connected with said shaft.

In testimony that I claim the foregoing as my own, I have hereto affixed my signature in the presence of two witnesses.

ELIJAH C. RINNER.

Witnesses:
B. F. VOORHEES,
THOS. E. DUNSAN.

Copies of this patent may be obtained for five cents each, by addressing the "Commissioner of Patents, Washington, D. C."